COMPUTER MEMORY SECTION IMPROVEMENTS

Filed Aug. 18, 1953 3 Sheets-Sheet 1

INVENTORS
ALBERT S. HOOK
H. KENNETH GOODMAN
GEORGE L. HUTTER
BY Strauch, Nolan & Diggins
ATTORNEYS March 28, 1961 A. S. HOOK ET AL 2,977,178

COMPUTER MEMORY SECTION IMPROVEMENTS

Filed Aug. 18, 1953 3 Sheets-Sheet 2

INVENTORS
ALBERT S. HOOK
H. KENNETH GOODMAN
GEORGE L. HUTTER
BY Strauch, Nolan & Diggins
ATTORNEYS March 28, 1961 A. S. HOOK ET AL 2,977,178

COMPUTER MEMORY SECTION IMPROVEMENTS

Filed Aug. 18, 1953 3 Sheets-Sheet 3

INVENTORS
ALBERT S. HOOK
H. KENNETH GOODMAN
GEORGE L. HUTTER

BY Strauch, Nolan & Diggins
ATTORNEYS

United States Patent Office 2,977,178

Patented Mar. 28, 1961

2,977,178

COMPUTER MEMORY SECTION IMPROVEMENTS

Albert S. Hook, Palos Verdes Estates, and Hazen Kenneth Goodman and George L. Hutter, Redondo Beach, Calif., assignors, by direct and mesne assignments, to Alwac International Incorporated, a corporation of Panama Filed Aug. 18, 1953, Ser. No. 375,002

4 Claims. (Cl. 346—74)

The present invention relates to improvements in electronic systems utilizing signals indicative of discrete bits of information and more particularly relates to improvements in systems of this general type which are designed primarily for the performance of mathematical computations.

Specifically the invention claimed herein relates to improvements in devices and electronic systems utilized for the temporary or permanent recording of signals indicative of various types of data to generate at a selectable subsequent time signals indicative of selectable portions of the same data as that which was recorded.

Devices for this purpose have taken many forms, varying from the utilization of a perforation in a card or tape as a slow speed data storage unit to cathode-ray tube units as extremely high speed data storage units. The basic storage unit of the present invention is of the magnetic drum type which, while being somewhat slower than the cathode-ray tube units, is much less expensive to produce and operate, which, thus far at least, has been found to be much more reliable, and which does not result in the loss of all stored data in the event of a power failure.

The data storage systems and devices of the prior art utilizing magnetic drum type units have had certain distinct disadvantages in that the drums did not have uniform recording characteristics over their entire record surface and did not record signals with sufficiently sharp definition and in that it has been impossible to accurately control the relation of the associated electromagnetic heads to their respective cooperating record tracks or the special relation between two or more of such heads when associated with a single track as a control in the time delay internally of the storage device.

It is accordingly the fundamental object of the present invention to provide in combination with an electronic system, such as a computer, a data storage system utilizing a magnetic record type storage device of such an improved construction that a data indicative signal in the form of sharply defined reversals of polarity of magnetization can be recorded at any point on the surface of a record drum with an accurately controllable flux density and sensed from said drum after an accurately determinable time delay for any given speed of rotation of the drum.

In furtherance of this fundamental object, it is an ancillary object of this invention to provide, in a data indicative signal responsive electronic system such as a computer, and improved magnetic record drum type storage device in which the magnetizable material of such storage device is isolated from the metallic strength providing carrier drum member by an insulating layer which is effective to materially reduce the signal distortion resulting from the hysteresis loss in the metallic carrier, which insulating layer is preferably formed of an epoxy resin due to the adhesiveness, machinability and electrical insulating qualities of such resins.

It is a further ancillary object of the present invention to provide in a data indicative signal responsive electronic system such as a computer, an improved magnetic record drum type storage device in which magnetizable material is formed in a uniformly thick layer over the entire drum record surface so that the entire record surface can be utilized with equal effectiveness as a selectively magnetizable recording medium.

It is a still further ancillary object of the present invention to provide, in a data indicative signal responsive electronic system such as a computer, an improved magnetic record drum type storage device in which magnetizable material is formed in a uniformly thick layer over the entire drum record surface so that the entire record surface can be utilized with equal effectiveness as a selectively magnetizable recording medium.

It is a still further ancillary object of the present invention to provide, in a data indicative signal responsive electronic system such as a computer, an improved magnetic drum type storage device in which the spacing between a record track and an associated electromagnetic head can be readily and accurately controlled and in which the circumferential spacing between a pair of electromagnetic heads associated with a single track and externally coupled through a delay line can be readily and accurately controlled to vary the total recirculation time of the recirculating delay line formed thereby as well as the delay time internally of the drum.

These and other objects of the present invention will become more fully apparent by reference to the appended claims and as the following detailed description proceeds in reference to the accompanying drawings wherein:

The electronic computer of the present invention, which is of the type in which the conditions during successive time intervals of a predetermined duration, of continuously generated two condition signals are indicative of the digits of successive denominational orders of a binary number, the lowest denominational order appearing first and the highest denominational order appearing last at any given reference point in point of time, is of the selectively sequenced type which is operable under control of a series of orders transmitted to its control section, to sequentially perform the basic steps of data transfer, addition, subtraction, multiplication, division or data comparison as required in the step by step solution of highly complex mathematical problems.

The various numbers which are utilized by the computer in the performance of its computations are stored or recorded in a magnetic drum type storage device which is divided into three basic storage sections in accordance with the time required to obtain access to the data stored therein.

Figure 1:
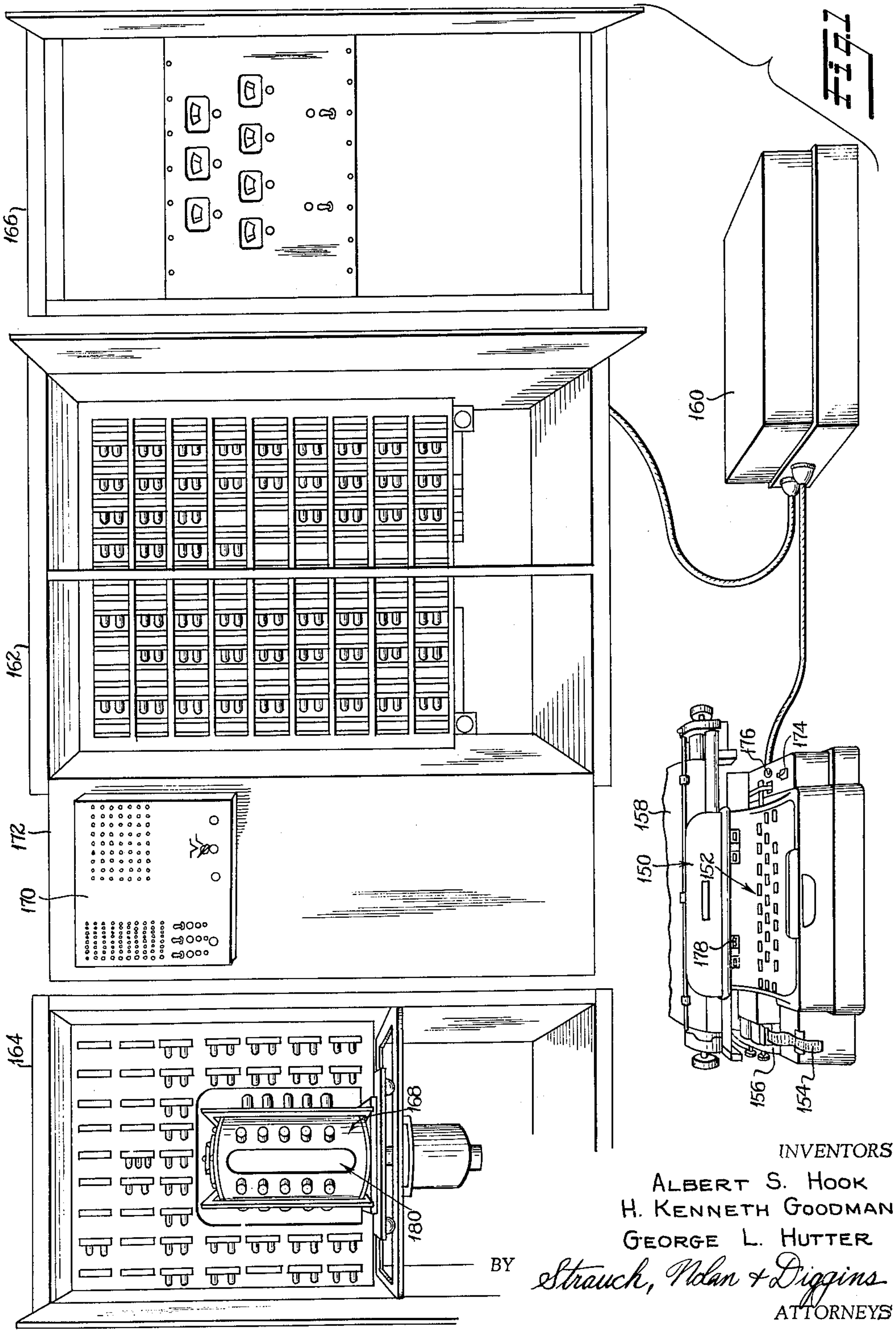
Figure 1 is a perspective view illustrating the several units making up the electronic computer of the present invention.

An over-all view of the computer is shown in Figure 1. Information is sent to the computer or received from the computer by means of a data input-output device 150 of the type known commercially as a Flexowriter. This input-output device 150 is a type of electric typewriter with attachments for punching and reading paper tapes of the type well known in the telegraph field. Information is transmitted from the input-output unit 150 by either manually typing word and number groups directly on the keyboard 152 or by automatically feeding a punched tape 154 containing the desired information through the tape reader 156. Answers from the computer will be automatically typed out directly on a sheet 158 of paper or punched on a new paper tape by a punching unit disposed rearwardly of the reader 156, or these two operations may be carried on simultaneously by the input-output unit 150.

A series of auxiliary relays which are associated with the operation of the input-output unit 150 are housed in a small box 160 located near and electrically connected to the input-output unit 150. These relays act conventionally as an intermediate translating device between the input-output unit 150 and the main body of the computer whereby the depression of a key or sensing of a combination of holes in the tape is effective to energize predetermined lines to the computer and vice versa.

The main body of the computer is housed in three cabinets 162, 164 and 166. These cabinets are referred to as the Logic Cabinet 162, the Memory Cabinet 164, and the Power Supply Cabinet 166.

Figures 2, 3:
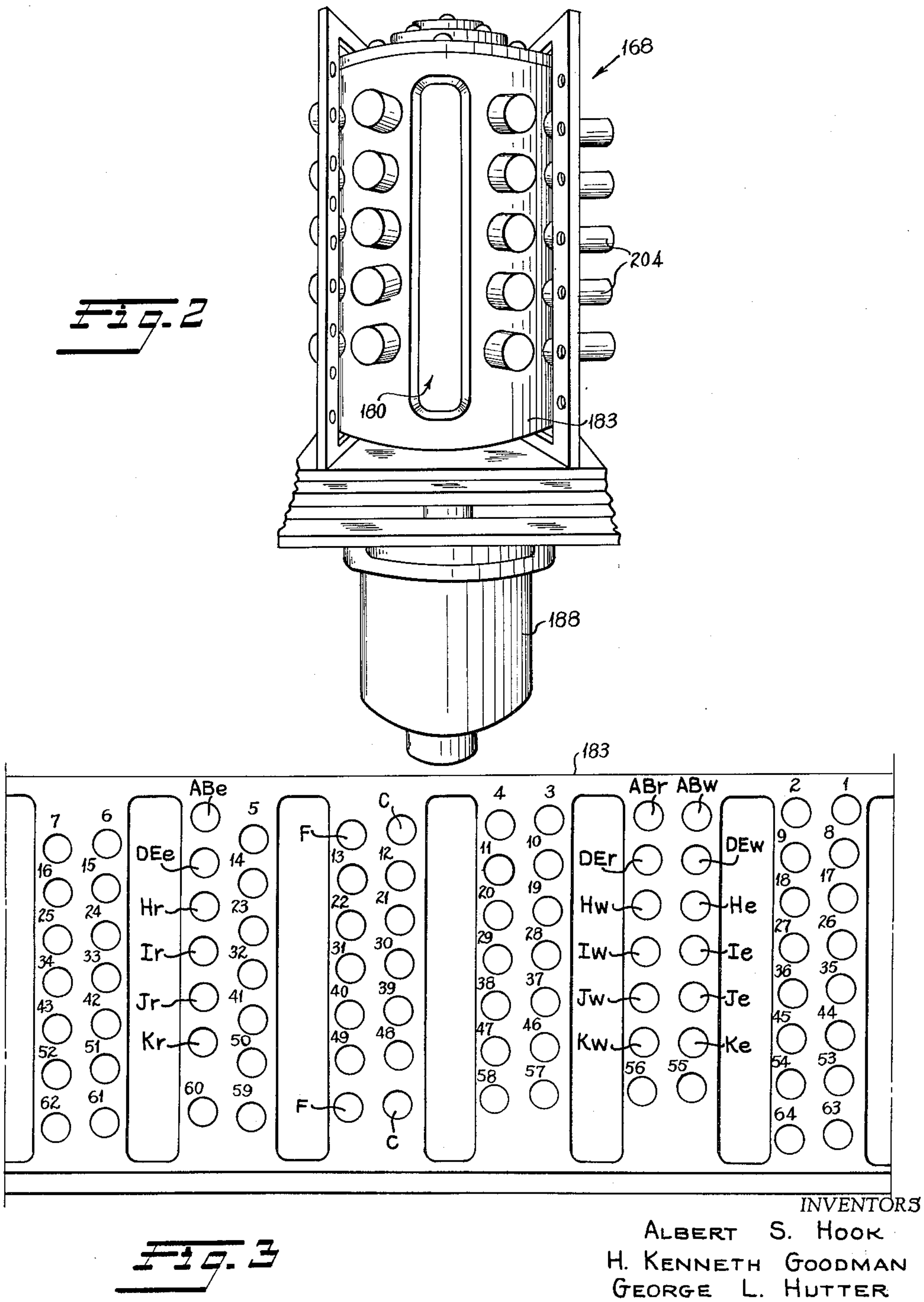
Figure 2 is a perspective view of the magnetic drum type recording unit of the present computer.
Figure 3 is a development of the exterior surface of the electromagnetic head mounting shell which is disposed about the magnetic drum and illustrating the location of the several electromagnetic heads relative to the drum.

The memory section 164 (Figure 1) includes the magnetic storage drum 180, means for storing or recording information on the drum, means for recovering or sensing the information that has been stored on the drum and the associated amplifying and pulse forming circuitry. A larger view of the magnetic storage device is shown in Figure 2.

Figure 4:
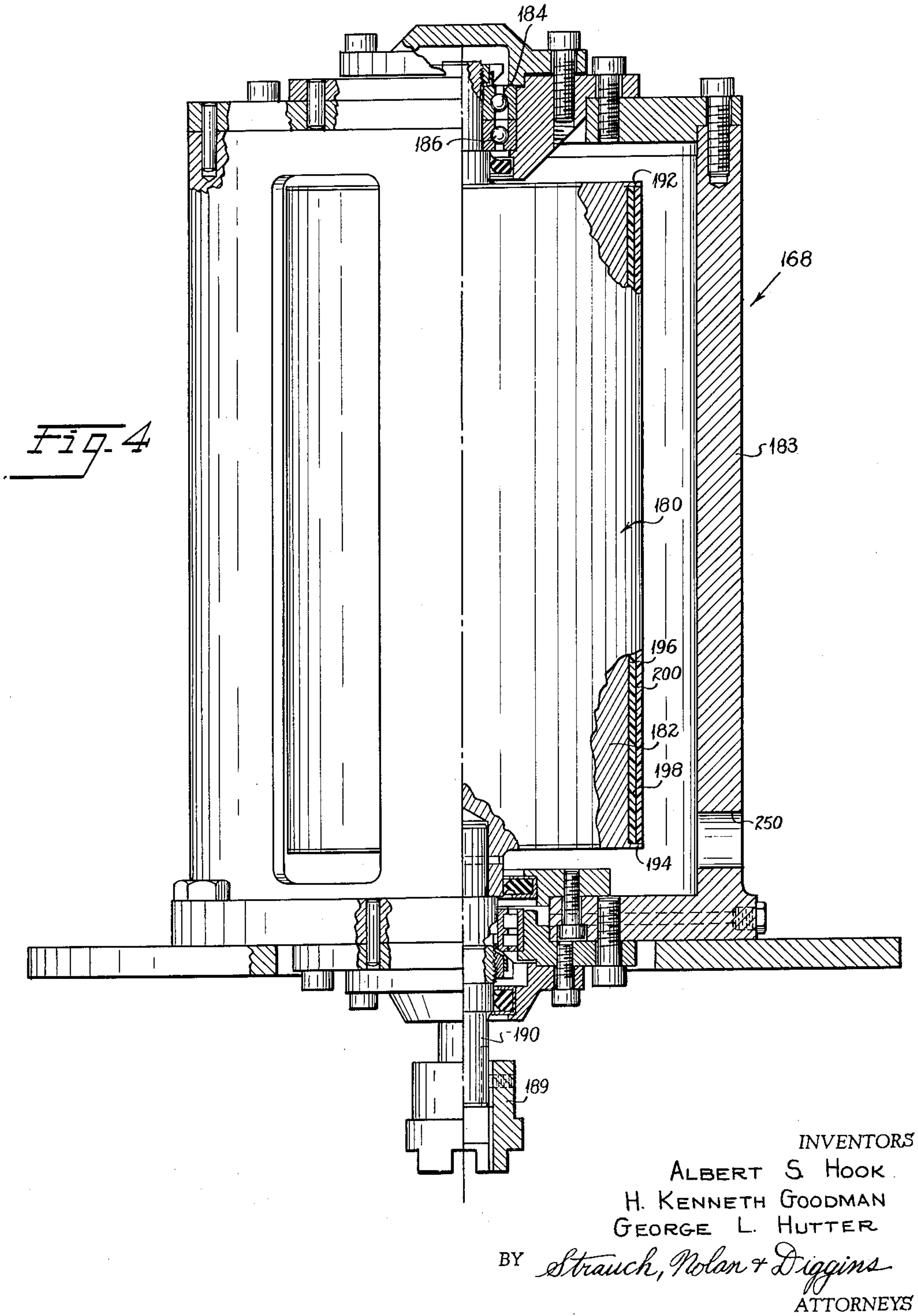
Figure 4 is an elevational view partially in section of the magnetic drum type storage unit showing in detail the construction of the record surface on the drum.

Physically, the drum 180, best shown in Figure 4, consists of an aluminum base cylinder 182 which is suspended within a hollow cylindrical housing or shell 183 from the top wall thereof by precision combined radial and thrust anti-friction bearings 184 and 186, cylinder 182 in the actual physical embodiment of the present invention being six inches in diameter and eleven and one-half inches long. During computer operation, drum 180 is rotated at a constant speed of 3450 revolutions per minute by an induction motor 188 (Figure 2). By relatively high rotational speeds as referred to in the claims is meant speeds in excess of 1000 r.p.m. Motor 188 is drive coupled by a coupling 189 to a downwardly extending shaft 190 fixed coaxially to the lower end of drum 180 (Figure 4).

*Drum structure.*—In manufacture, the outer surface of the cylinder 182 is machined so that a concentricity is maintained to within one ten-thousandths of an inch, radially extending flanges 192 and 194, each approximately twelve-thousandths of an inch in radial height, being provided at each axial extremity of the drum 182. The surface 196 of cylinder 182 intermediate flanges 192 and 194 is coated, as by spraying, to a thickness slightly greater than ten-thousandths of an inch with an insulating material, the layer of insulating material being sufficiently thick to materially reduce the signal distortion resulting from the hysteresis loss in the metallic carrier. The insulating material has the physical properties of adhesiveness and machinability, and therefore necessarily must be substantially hard, uncompressible and non-resilient and is preferably an epoxy resin which forms a machinable non-conductive layer upon the surface 196 of the drum 180. The preferred epoxy resin is that known as Epon 828 sold by the Shell Chemical Corporation of 500 Fifth Avenue, New York 18, New York and 100 Bush Street, San Francisco, California. After this epoxy resin has hardened, it is machined to a thickness of ten-thousandths of an inch. This forms a thin hard, non-compressible, non-resilient and machinable insulating layer 198 upon the drum surface 196. A dispersion of iron oxide particles in a suitable binder such as shellac is applied over the insulating layer 198 to form a layer 200 approximately fifteen ten-thousandths of an inch thick constituting a recording medium of sufficiently high coercivity to retain magnetization of a discrete portion thereof for a practically indefinite duration until erased or another magnetic field is applied thereto. After this dispersion has dried, the surface of the drum is polished to provide a uniform cylindrical surface. The magnetic dispersion used is similar to the type used on conventional magnetic recording tapes. In the prior art drum structures, it has been found extremely difficult to provide a magnetizable coating of uniform thickness along the entire length of the drum, the coating tending to taper to a relatively thin layer in the region adjacent each end of the drum. It has been discovered that by the provision of the radially extending flanges 192 and 194 at each end of the section of the drum surface to be coated, a dispersion of uniform thickness can be provided along the entire length of the drum and thus provide a uniform recording medium over the entire length of the drum.

A further improved aspect of the recording drum of the present computer resides in the provision of the non-conductive layer 198 intermediate the conductive base cylinder 182 and the magnetic dispersion layer 200. The effect of this intermediate insulating layer is to eliminate, to a large extent, the distortion and loss of strength of a recorded signal heretofore resulting from the eddy currents in the metallic base of the drum. A a result of this improved construction, a recorded signal on the periphery of the drum will produce a much sharper signal sensed by a reading head than the signals heretofore achievable with drums constructed in accordance with prior art teachings.

*Magnetic head mounts and drum layout.*—The recording surface of the drum 180, formed by the dispersion layer 200, is effectively divided into 72 axially spaced parallel annular strips upon which signals can be recorded. Each of such strips is known as a record track and the location of each such track longitudinally of the drum 180 is defined by the location of the associated reading and recording heads. Associated with certain of these tracks are read, record and erase heads; with others, a read head; and with others a dual purpose read-record head. Each of such heads consists of coil of fine wire wound upon a magnetic core of high permeability. The specific characteristics of these heads are chosen in accordance with the intended use in accordance with the conventional practice of the art. In reading a change of polarization of the layer 200 from one direction to the other will induce current flow in a sensing head in one direction and a reverse change in polarization will induce the opposite direction of current flow, one indicative of a change from binary zeros to ones and the other from ones to zeros. In recording, the passage of current through the coil in one direction will produce one direction of magnetization of the layer 200 under the head and reversal of current will reverse the magnetization one direction of current flow and the corresponding magnetization is indicative of a binary 1 and the opposite a binary 0.

Referring to Figure 4, it has been previously indicated that the drum 180 is mounted within a cylindrical support or shell 183. This shell 183 is provided with a plurality of through apertures 250, the axes of which are normal to and intersect the axis of rotation of the drum 180 when mounted for rotation within shell 183. Figure 3 is a development of the external surface of the shell 183 showing the location of all of the apertures 250, the apertures as shown in Figure 3 having been assigned reference symbols indicative of the actual function in the computer of the head to be mounted therein as is explained in detail in companion application Serial No. 374,988 of Beek and Hagen filed on even date herewith and assigned to the assignee of the present invention, which is hereby incorporated by reference to any extent as may be deemed necessary.

Thus, in accordance with the present invention, an improved storage surface is provided on the magnetic drum which is adapted for high speed operation relative to stationary recording heads which are spaced a very small distance from the drum surface to avoid physical contact. The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A data storage device of the type having a drum mounted for continuous rotation at relatively high rotational operating speeds for use as a memory section in a computer, said device utilizing as an indication of recorded data the selective magnetization of discrete portions of a magnetizable substance of sufficiently high coercivity to retain such selective magnetization over extended periods of time, said device comprising: a metallic, rotatable non-magnetic drum structure forming a rigid carrier; a continuous layer of such magnetizable substance applied around the periphery of said drum structure; an electromagnetic head in operative relationship with said magnetizable substance and spaced to prevent rubbing contact therewith; and a layer of a hard, machinable electrical insulating material disposed substantially concentrically about said drum and being sufficiently rigid to maintain said concentricity at said operating speeds, said insulating layer being interposed between said layer of magnetizable substance and the peripheral surface of said drum, and having a thickness sufficient to minimize the effect of circulating currents in said drum structure upon there being a magnetic field applied to a discrete portion of said continuous magnetizable layer.

2. A data storage device utilizing as an indication of recorded data the selective magnetization of discrete portions of a magnetizable substance of sufficiently high coercivity to retain such selective magnetization over extended periods of time, said device comprising: a metallic, non-magnetic rotatable drum structure forming a rigid carrier; a continuous layer of such magnetizable substance applied around the periphery of said drum structure; and a hard layer of adhesive machinable electrical insulating material for minimizing the effect of circulating currents in said drum structure upon there being a magnetic field applied to a discrete portion of said continuous magnetizable layer, said insulating layer being interposed between said layer of magnetizable substance and the peripheral surface of said drum and being substantially concentrically disposed about said drum surface and capable of being machined to a concentricity tolerance in the order of one-ten thousandth of an inch about said drum, said material further being sufficiently rigid so as to be capable of maintaining said concentricity when said drum is rotated at a speed in the order of 3450 r.p.m.

3. A data storage device utilizing as an indication of recorded data the selective magnetization of discrete portions of a magnetizable substance of sufficiently high coercivity to retain such selective magnetization over extended periods of time, said device comprising: a metallic, non-magnetic drum structure forming a rigid carrier; a continuous layer of such magnetizable substance substantially coextensive with the periphery of said drum structure; an electromagnetic head in operative relationship with said magnetizable substance and spaced to prevent rubbing contact therewith; and a layer of a hard machinable electrical insulating material composed in substantial part of an epoxy resin interposed between said layer of magnetizable substance and the peripheral surface of said drum, said layer of insulating material having a thickness sufficient to minimize the effect of circulating currents in said drum structure upon there being a magnetic field applied to a discrete portion of said continuous magnetizable layer.

4. A data storage device utilizing as an indication of recorded data the selective magnetization of discrete portions of a magnetizable substance of sufficiently high coercivity to retain such selective magnetization over periods of time, said device comprising: a metallic non-magnetic drum structure forming a rigid carrier, a continuous layer of such magnetizable substance substantially coextensive with the periphery of said drum structure, radial flanges at opposite ends of said drum extending beyond the periphery of said drum, a layer of hard solid machinable epoxy resin electrical insulating material interposed between said layer of magnetizable substance and the peripheral surface of said drum and being coextensive with the periphery of said drum between said flanges and bonded to the peripheral surface of said drum and to said magnetizable substance layer, said layer of insulating material having a thickness sufficient to minimize the effect of circulating currents in said drum structure upon there being a magnetic field applied to a discrete portion of continuous magnetizable layer.

References Cited in the file of this patent

UNITED STATES PATENTS

| | | |
|---|---|---|
| 2,185,300 | Hickman | Jan. 2, 1940 |
| 2,540,654 | Cohen et al. | Feb. 6, 1951 |
| 2,566,441 | Camras | Sept. 4, 1951 |
| 2,617,705 | Coombs et al. | Nov. 11, 1952 |
| 2,629,827 | Eckert et al. | Feb. 24, 1953 |
| 2,635,229 | Gloess et al. | Apr. 14, 1953 |
| 2,674,732 | Robbins | Apr. 6, 1954 |
| 2,674,733 | Robbins | Apr. 6, 1954 |
| 2,708,693 | Hendrickson | May 17, 1955 |
| 2,772,135 | Hollabaugh et al. | Nov. 27, 1956 |

FOREIGN PATENTS

| | | |
|---|---|---|
| 657,494 | Great Britain | Sept. 19, 1951 |